(12) United States Patent
Smith

(10) Patent No.: US 6,568,122 B1
(45) Date of Patent: May 27, 2003

(54) FISHING ROD HOLDER APPARATUS

(76) Inventor: Clyde D. Smith, 17050 Pike 163, Louisiana, MO (US) 63353

( * ) Notice: Subject to any disclaimer, the term of this patent is extended or adjusted under 35 U.S.C. 154(b) by 0 days.

(21) Appl. No.: 09/659,116

(22) Filed: Sep. 13, 2000

(51) Int. Cl.[7] ............................................. A01K 97/10
(52) U.S. Cl. ........................ 43/21.2; 248/530; D22/147
(58) Field of Search ........................... 43/21.2; 248/530, 248/533; D22/147

(56) References Cited

U.S. PATENT DOCUMENTS

| | | | | |
|---|---|---|---|---|
| 2,059,921 A | * | 11/1936 | Weiss | 248/530 |
| 2,543,569 A | * | 2/1951 | Dusatko | 248/530 |
| 2,592,306 A | * | 4/1952 | Maze | 248/533 |
| 2,888,220 A | * | 5/1959 | Rose | 43/21.2 |
| 2,902,237 A | * | 9/1959 | Carper | 248/530 |
| 2,934,298 A | * | 4/1960 | Aleskin | 248/530 |
| 3,020,014 A | * | 2/1962 | Emery | 248/530 |
| 3,033,503 A | * | 5/1962 | Wenderski | 43/21.2 |
| 3,162,970 A | * | 12/1964 | Gould | 43/21.2 |
| 3,327,978 A | * | 6/1967 | Gates | 348/533 |
| 3,411,739 A | * | 11/1968 | Barfield | 248/530 |
| 3,956,846 A | * | 5/1976 | Kent | 43/21.2 |
| D270,080 S | * | 8/1983 | Culp | D22/147 |
| 4,517,761 A | * | 5/1985 | Bleggi | 43/21.2 |
| D397,405 S | * | 8/1998 | Smith | D22/147 |

* cited by examiner

*Primary Examiner*—Kurt Rowan

(57) ABSTRACT

A fishing rod holder apparatus includes a first support unit which includes a V-shaped rod reception portion and a pair of first risers connected to opposite ends of the V-shaped rod reception portion. A second support unit includes a pair of railing rest members connected to the pair of first risers for resting on top of a railing and also includes a downwardly extending U-shaped member which serves to laterally confine the railing rest. A third support unit is connected to the second support unit, and the third support unit includes a front extension portion connected to the second support unit. A first handle rest portion is connected to the front extension portion. A rear extension portion is connected to the first handle rest portion, and a second handle rest portion is connected to the rear extension portion. With another embodiment of the invention, the second support unit includes an pair of adjustment tubes, and the third support unit includes a pair of adjustment rods which are telescopically received in the pair of adjustment tubes. Each of the adjustment tubes includes a first direction projecting tube portion and a second direction projecting tube portion. The first direction projecting tube portion is longer than the second direction projecting tube portion. Locking devices are provided for locking the pair of adjustment rods with respect to the pair of adjustment tubes.

9 Claims, 4 Drawing Sheets

FISHING ROD HOLDER APPARATUS

BACKGROUND OF THE INVENTION

1. Field of the Invention

The present invention relates generally to fishing rod holders and, more particularly, to fishing rod holders especially adapted for being supported by a horizontally oriented support, such as a boat railing or a dock railing.

2. Description of the Prior Art

Fishing is an activity that often takes a large amount of patience. A person may use a fishing rod a relatively long time before a fish bites at a hook at the end of a line. Because of the time involved, a person may become bored waiting for a fish to bite. To relieve a person of considerable boredom and inactivity for considerable periods of time, throughout the years, a number of innovations have been developed relating to devices which support a fishing rod, with a hook and line in the water, so that it need not be held by a person. However, when a fish does bite, the fishing rod can easily be grasped by the person, and the person can reel in the fish.

Fishing rod holders come it two basic types: those supported by the ground; and those supported by an above-ground horizontally oriented support, such as a boat railing or a dock railing. Although the present invention relates to fishing rod holders supported by an above-ground, horizontally oriented support, such as a boat railing or a dock railing, those supported by the ground are briefly discussed in relation to desirable features for any fishing rod holder.

One problem associated with a number of conventional ground-supported fishing rod holders relates to the fact that the fishing rod handle are supported in such a way that a longitudinally directed pull along the longitudinal axis of the fishing rod itself tends to pull the fishing rod out from the fishing rod holder. In this respect, for any fishing rod holder, it would be desirable if the fishing rod holder prevents a fishing rod from being pulled out from the fishing rod holder by a longitudinally directed pull along the longitudinal axis of the fishing rod itself.

Another problem associated with a number of conventional ground-supported fishing rod holders relates to a tendency to dislodge the fishing rod from the fishing rod holder when a side to side force is exerted on the fishing rod. This can occur when a hooked fish swims from side to side in the water. In this respect, it would be desirable if a fishing rod holder reduces a tendency for the fishing rod to be dislodged from the fishing rod holder when a side to side force is exerted on the fishing rod.

Yet another problem associated with a number of conventional ground-supported fishing rod holders relates to the ability of a person to quickly remove the fishing rod from the fishing rod holder when a fish strikes at the hook. Moreover, the trajectory of removing the fishing rod from the fishing rod holder should be conducive to retaining the fish on the hook. Such features are not present in some conventional fishing rod holders. In this respect, it would be desirable if a fishing rod holder permitted a person to quickly remove a fishing rod from the fishing rod holder along a trajectory that is conducive to retaining the hooked fish on the hook.

Now turning to fishing rod holders supported by an above-ground, horizontally oriented support, such as a boat railing or a dock railing, U.S. Pat. No. D397,405, of the present inventor herein, discloses such a fishing rod holder. In this respect, U.S. Pat. No. D397,405 is herein incorporated by reference. In fact, the features of the fishing rod holder in U.S. Pat. No. D397,405 permit it to be used as a ground-supported fishing rod holder as well. The two spikes which extend downward, can be inserted into the ground. In addition, the V-shaped portion of the fishing rod holder in U.S. Pat. No. D397,405 permits a fishing rod to be retained in the crotch of the V-shaped rod support. As a result, if a fishing rod is pulled longitudinally along the longitudinal axis of the fishing rod, the handle of the fishing rod is retained by the V-shaped rod support and is blocked from being pulled longitudinally out from the fishing rod holder. Moreover, the V-shaped rod support prevents a fishing rod from being moved side to side when a hooked fish swims from side to side in the water. Also, the fishing rod holder in U.S. Pat. No. D397,405 permits a person to quickly remove a fishing rod from the fishing rod holder along a trajectory that is conducive to retaining the hooked fish on the hook. That is, the desirable trajectory of pulling the fishing rod upward and backward from the fishing rod can be easily accomplished by the fishing rod holder in U.S. Pat. No. D397,405.

Now, by the present invention herein, a fishing rod holder is provided that retains all of the benefits of the fishing rod holder of U.S. Pat. No. D397,405, and, in addition, provides additional features and benefits. It is noted that a portion of the fishing rod holder which is used to secure the fishing rod holder to an above-ground, horizontally oriented support, such as a boat railing or a dock railing, is not with respect to the width of the railing upon which the holder rests. Given the fact that the widths of different boat railings and dock railings vary, it would be desirable if a fishing rod holder were provided that is adjustable to fit a variety of widths of railings.

In addition, U.S. Pat. No. D397,405 does not specifically provide a structure which receives and supports a handle of a fishing rod and the reel of the fishing rod. So that a fishing rod holder can be effectively used to support a fishing rod and be left unattended, it would be desirable if a fishing rod holder included structures with receive and support and handle and reel of a fishing rod.

Thus, while the foregoing body of prior art indicates it to be well known to use fishing rod holders, the prior art described above does not teach or suggest a fishing rod holder which has the following combination of desirable features: (1) prevents a fishing rod from being pulled out from the fishing rod holder by a longitudinally directed pull along the longitudinal axis of the fishing rod itself; (2) reduces a tendency for the fishing rod to be dislodged from the fishing rod holder when a side to side force is exerted on the fishing rod; (3) permits a person to quickly remove a fishing rod from the fishing rod holder along a trajectory that is conducive to retaining a hooked fish on the hook; (4) is adjustable to fit a variety of widths of railings; and (5) includes structures with receive and support and handle and reel of a fishing rod. The foregoing desired characteristics are provided by the unique fishing rod holder apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides a fishing rod holder apparatus which includes a first support unit which includes a V-shaped rod reception portion and first lateral confinement means for supporting the V-shaped rod reception portion. A second support unit includes railing rest means connected to the first lateral confinement means, for resting on top of a railing. The second support unit also includes second lateral confinement means connected to the railing rest. A third support unit is connected to the second support unit. The third support unit includes a front extension portion connected to the second support unit. A first handle rest portion is connected to the front extension portion. A rear extension portion is connected to the first handle rest portion, and a second handle rest portion is connected to the rear extension portion.

The first lateral confinement means includes a pair of first risers connected to opposite ends of the V-shaped rod reception portion. The railing rest means includes a pair of railing rest members connected to the pair of first risers and includes a U-shaped member. The front extension portion is connected to the second support unit by a downwardly curved portion. The second handle rest portion is connected to the rear extension portion by an upwardly curved portion.

With a second embodiment of the invention, the second support unit includes first separation distance adjustment means, and the third support unit includes second separation distance adjustment means which engage with the first separation distance adjustment means. A reinforcement strut is connected between the first risers.

The first separation distance adjustment means includes a pair of adjustment tubes, and the second separation distance adjustment means includes a pair of adjustment rods telescopically received in the adjustment tubes. Each of the adjustment tubes includes a first direction projecting tube portion and a second direction projecting tube portion. The first direction projecting tube portion is longer than the second direction projecting tube portion.

Locking means are provided for locking the first separation distance adjustment means in a selected location with respect to the second separation distance adjustment means. The locking means includes locking bolt reception channels in the adjustment tubes, and locking bolts are received in the locking bolt reception channels.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining at least two preferred embodiments of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved fishing rod holder apparatus which has all of the advantages of the prior art and none of the disadvantages.

It is another object of the present invention to provide a new and improved fishing rod holder apparatus which may be easily and efficiently manufactured and marketed.

It is a further object of the present invention to provide a new and improved fishing rod holder apparatus which is of durable and reliable construction.

An even further object of the present invention is to provide a new and improved fishing rod holder apparatus which is susceptible of a low cost of manufacture with regard to both materials and labor, and which accordingly is then susceptible of low prices of sale to the consuming public, thereby making such fishing rod holder apparatus available to the buying public.

Still yet a further object of the present invention is to provide a new and improved fishing rod holder apparatus which prevents a fishing rod from being pulled out from the fishing rod holder by a longitudinally directed pull along the longitudinal axis of the fishing rod itself.

Still another object of the present invention is to provide a new and improved fishing rod holder apparatus that reduces a tendency for the fishing rod to be dislodged from the fishing rod holder when a side to side force is exerted on the fishing rod.

Yet another object of the present invention is to provide a new and improved fishing rod holder apparatus which permits a person to quickly remove a fishing rod from the fishing rod holder along a trajectory that is conducive to retaining a hooked fish on the hook.

Even another object of the present invention is to provide a new and improved fishing rod holder apparatus that is adjustable to fit a variety of widths of railings.

Still a further object of the present invention is to provide a new and improved fishing rod holder apparatus which includes structures with receive and support and handle and reel of a fishing rod.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein.

DESCRIPTION OF THE PREFERRED EMBODIMENT

With reference to the drawings, a new and improved fishing rod holder apparatus embodying the principles and concepts of the present invention will be described.

Figure 1:
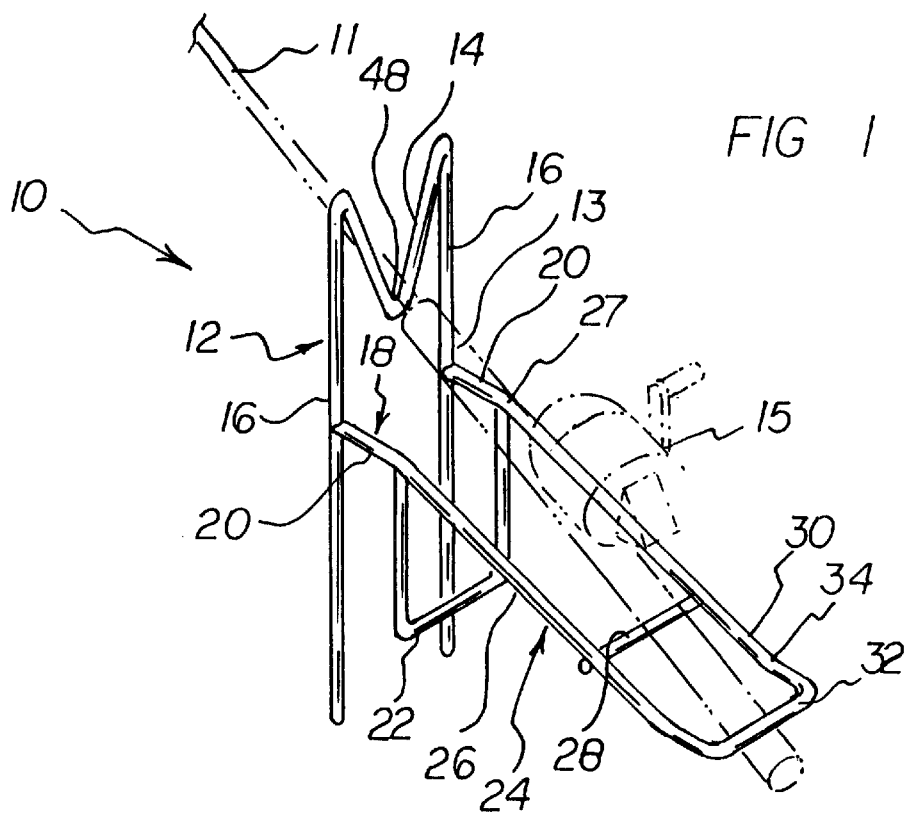
FIG. 1 is a perspective view showing a first embodiment of the fishing rod holder apparatus of the invention, with a fishing rod, including handle and reel, shown in broken lines.
Figure 2:
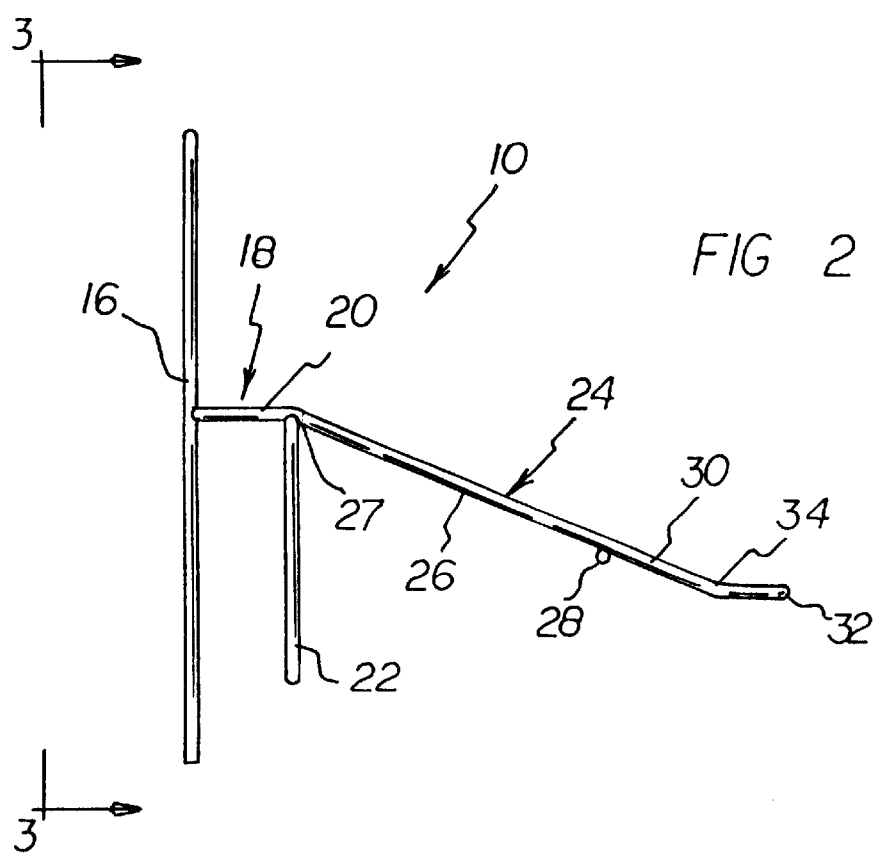
FIG. 2 is a side view of the embodiment of the fishing rod holder apparatus shown in FIG. 1.
Figure 3:
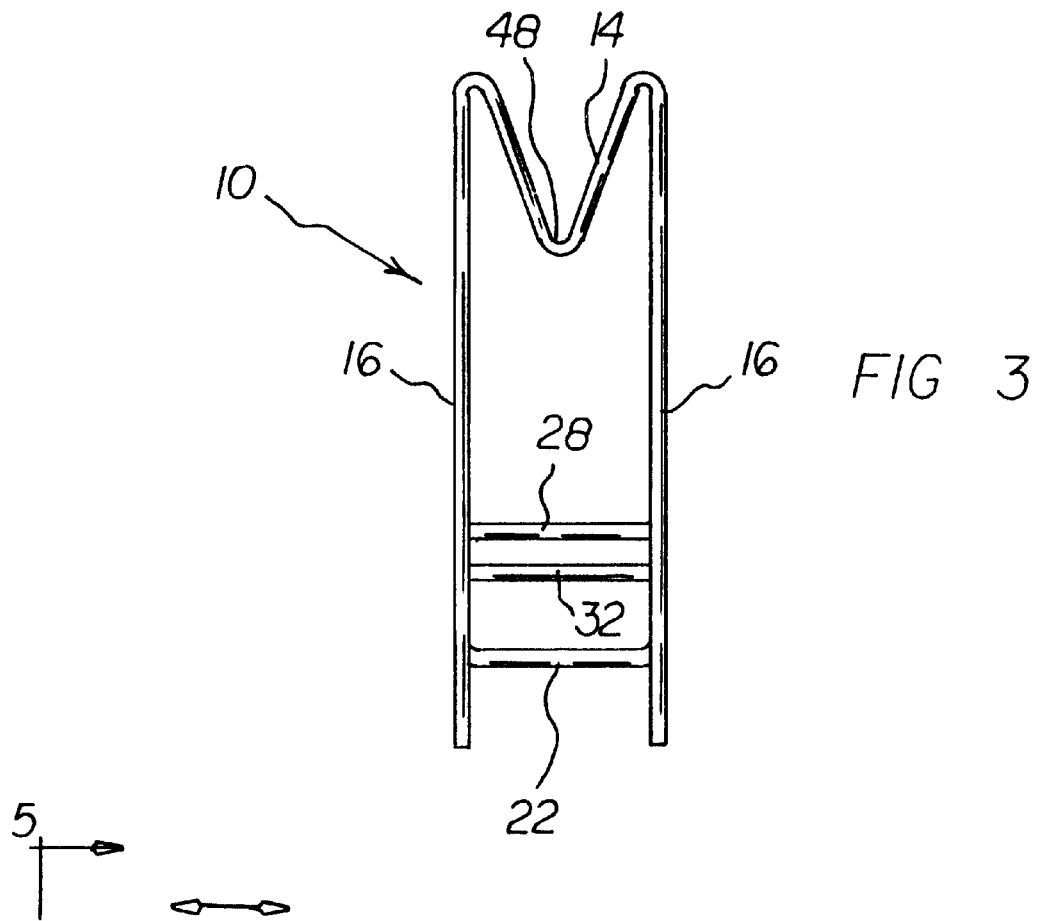
FIG. 3 is a front view of the embodiment of the fishing rod holder apparatus of FIG. 2 taken along line 3—3 thereof.

In FIGS. 1–3, a first embodiment of a fishing rod holder apparatus 10 includes a first support unit 12 which includes a V-shaped rod reception portion 14 and first lateral confinement means for supporting the V-shaped rod reception portion 14. A second support unit 18 includes railing rest means connected to the first lateral confinement means, for resting on top of a railing. The second support unit 18 also includes second lateral confinement means connected to the railing rest. A third support unit 24 is connected to the second support unit 18. The third support unit 24 includes a front extension portion 26 connected to the second support unit 18. A first handle rest portion 28 is connected to the front extension portion 26. A rear extension portion 30 is connected to the first handle rest portion 28, and a second handle rest portion 32 is connected to the rear extension portion 30.

The first lateral confinement means includes a pair of first risers 16 connected to opposite ends of the V-shaped rod reception portion 14. The railing rest means includes a pair of railing rest members 20 connected to the pair of first risers 16 and includes a U-shaped member 22. The front extension portion 26 is connected to the second support unit 18 by a downwardly curved portion 27. The second handle rest portion 32 is connected to the rear extension portion 30 by an upwardly curved portion 34.

To use the first embodiment of the invention, the fishing rod holder apparatus 10 is placed over the top of a railing (not shown) that is on a boat or a dock. The railing would be positioned between the downward projecting portions of the first risers 16 in front of the railing, the horizontally projecting railing rest members 20 on top of the railing, and the downwardly projecting vertical support portion 22 behind the railing. A fishing rod and reel is obtained and includes a rod portion 11 which has a relatively small diameter, a handle portion 13 which is connected to the rod portion 11 and which has a relatively large diameter, and a reel portion 15 supported on the handle portion 13. The rod portion 11, the handle portion 13, and the reel portion 15 are shown in broken lines in FIG. 1.

As shown in FIG. 1, with respect to the fishing rod and reel, the rod portion 11 is placed in the crotch portion 48 of the V-shaped rod reception portion 14. A portion of the handle portion 13 is placed over the first handle rest portion 28, and a portion of the handle portion 13 is placed under the second handle rest portion 32. When this is done, the fishing rod and reel is supported by the fishing rod holder apparatus 10. More specifically, the handle portion 13 forms a lever in which a portion of the lever is supported by the crotch portion 48 of the V-shaped rod reception portion 14, a portion of the lever is supported by the first handle rest portion 28, and a portion of the lever system pushes upward on the bottom of the second handle rest portion 32.

As shown in FIG. 1, the reel portion 15 of the fishing rod and reel is positioned forward of the first handle rest portion 28, between the first handle rest portion 28 and the railing rest members 20. Alternatively, if desired, but not shown in the drawings, the reel portion 15 can be positioned between the first handle rest portion 28 and the second handle rest portion 32. In this way, the reel portion 15 would be cradled in the upwardly curved portion 34 between the rear extension portion 30 and the second handle rest portion 32.

If a fish is hooked and the rod portion 11 is pulled longitudinally forward, the crotch portion 48 of the V-shaped rod reception portion 14 blocks the relatively large diameter handle portion 13 from moving forward past the V-shaped rod reception portion 14. The V-shaped rod reception portion 14 also prevents the rod portion 11 from moving side to side. When a fish is hooked, the person fishing can simply pull the fishing rod and reel upward and out from the fishing rod holder apparatus 10. The first embodiment of the invention can be provided as a unified, one-piece structure.

Turning to FIGS. 4–7, a second embodiment of the invention is shown. Reference numerals are shown that correspond to like reference numerals that designate like elements shown in the other figures. In addition, the second support unit 18 includes first separation distance adjustment means, and the third support unit 24 includes second distance adjustment means which engage with the first separation distance adjustment means. A reinforcement strut 17 is connected between the first risers 16.

The first separation distance adjustment means includes a pair of adjustment tubes 36, and the second separation distance adjustment means includes a pair of adjustment rods 38 telescopically received in the adjustment tubes 36. Each of the adjustment tubes 36 includes a first direction projecting tube portion 40 and a second direction projecting tube portion 42. The first direction projecting tube portion 40 is longer than the second direction projecting tube portion 42.

Locking means are provided for locking the first separation distance adjustment means in a selected location with respect to the second separation distance adjustment means. The locking means includes locking bolt reception channels 44 in the adjustment tubes 36, and locking bolts 46 are received in the locking bolt reception channels 44.

The second embodiment of the invention is used in substantially the same way as the first embodiment of the invention described above. However, the second embodiment of the invention provides the ability to adjust the separation distance 19 between the first risers 16 and the vertical support portion 22 to accommodate railings having a variety of widths. More specifically, the adjustment rods 38 are received in the adjustment tubes 36 and are locked into desired positions by the locking bolts 46, which are shown to be bolts which receive an Allen wrench for tightening and untightening.

Figure 4:
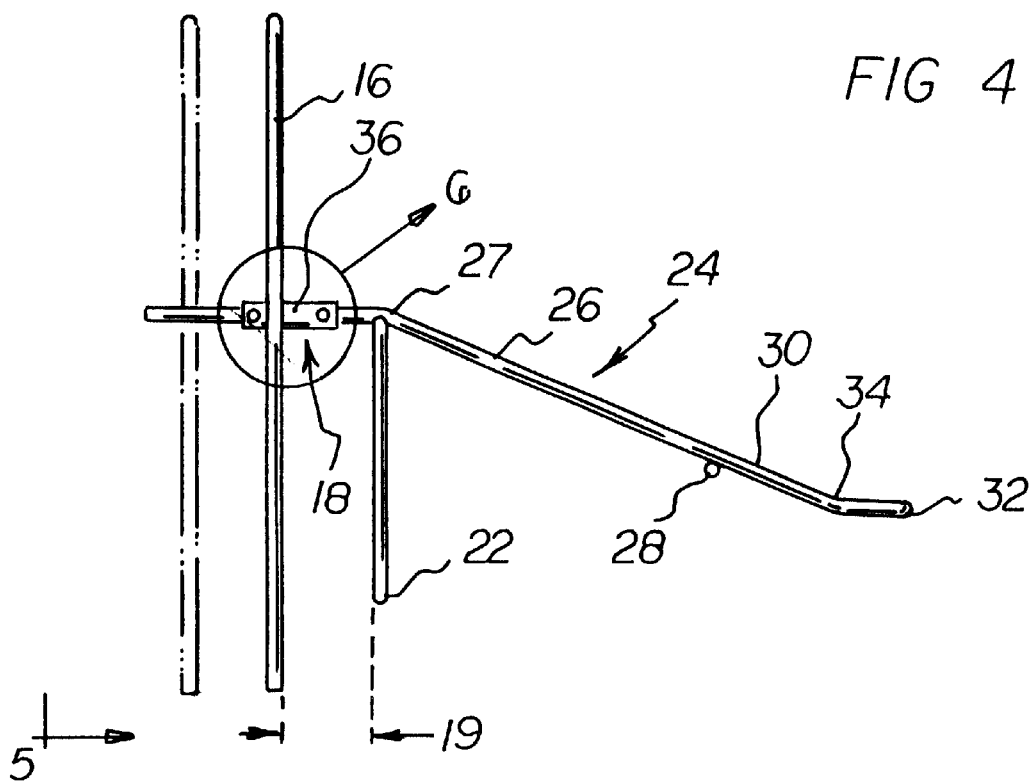
FIG. 4 is a side view of a second embodiment of the invention which has an adjustable width for being supported by a railing.
Figure 5:
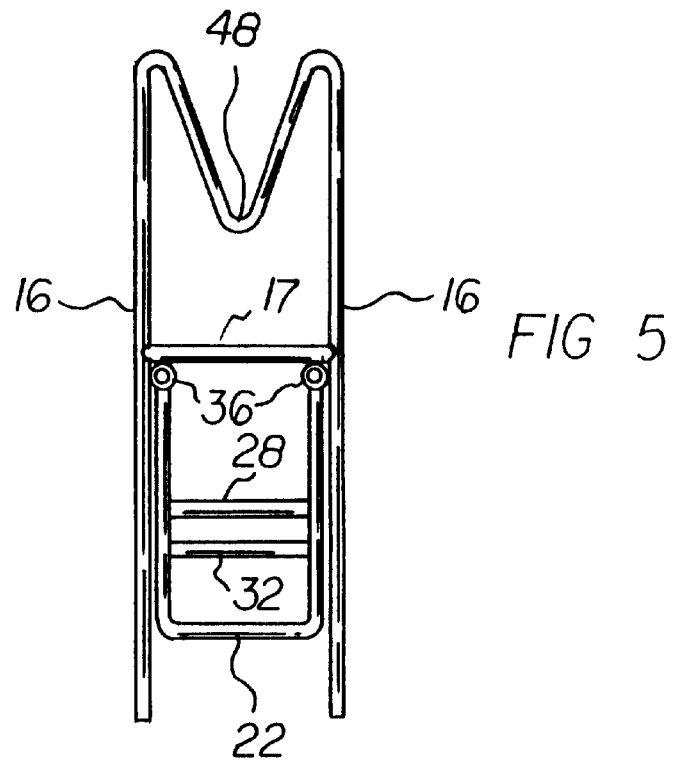
FIG. 5 is a front view of the embodiment of the fishing rod holder apparatus of FIG. 4 taken along line 5—5 thereof.
Figure 6:
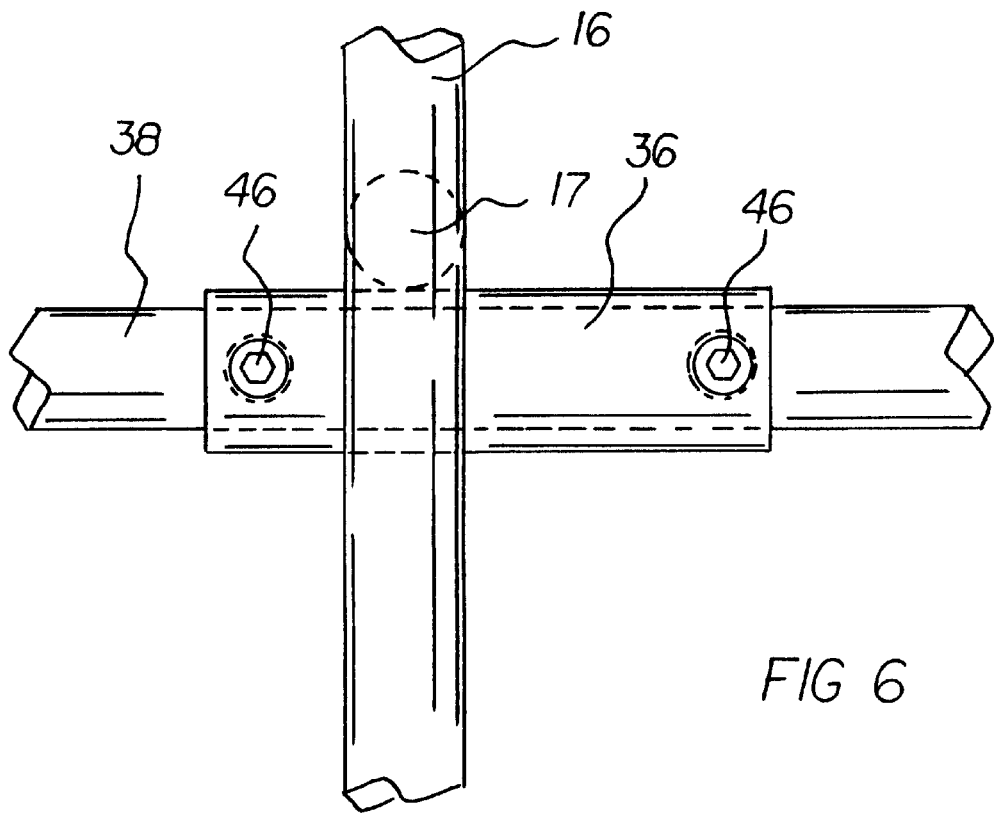
FIG. 6 is an enlarged view of the portion of the embodiment shown in circled region 6 of FIG. 4.
Figure 7:
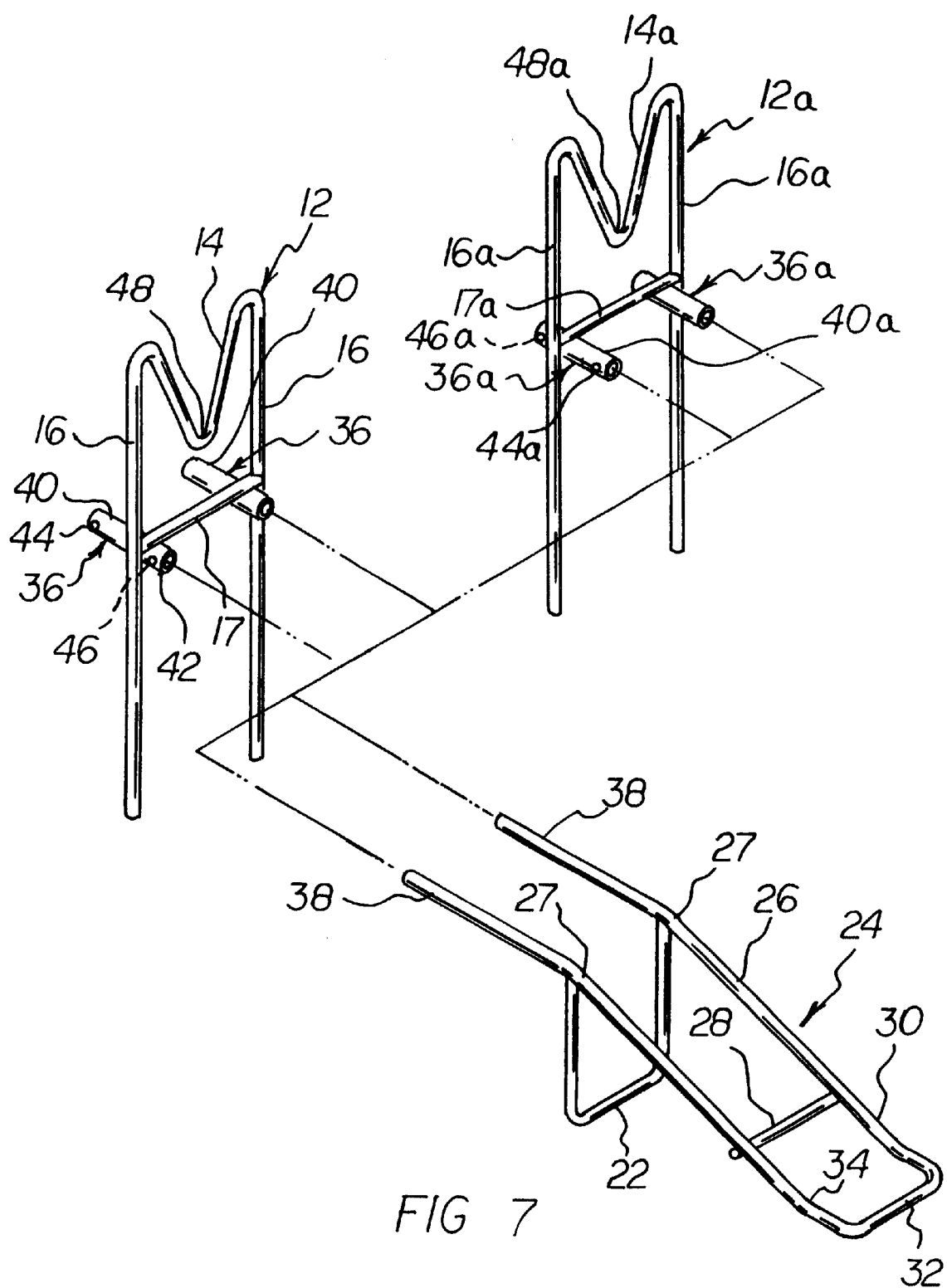
FIG. 7 is an exploded perspective view of the embodiment of the invention shown in FIGS. 4–6, showing a selectable orientation of a portion of the apparatus.

Another feature providing for the adjustment of the separation distance 19 between the first risers 16 and the vertical support portion 22 relates to the orientation of the first support unit 12 so that the relatively long first direction projecting tube portions 40 either project backward, such as shown in FIGS. 4, 6, and 7 (the first support unit 12a and associated figure elements with the "a" labelled reference numerals), or project forward, such as shown with the nonalphabetically labelled first support unit 12 and associated reference numerals shown in FIG. 7. When the first direction projecting tube portions 40 are oriented forward, the vertical support portion 22 and the first risers 16 can be moved relatively close together so that the minimum separation distance 19 is relatively short. In contrast, when the first direction projecting tube portions 40 are oriented backward, the vertical support portion 22 and the first risers 16 can be moved farther apart, and the maximum separation distance 19 is relatively long.

The components of the fishing rod holder apparatus of the invention can be made from inexpensive and durable metal and plastic materials.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved fishing rod holder apparatus that is low in cost, relatively simple in design and operation, and which may advantageously be used to prevent a fishing rod from being pulled out from the fishing rod holder by a longitudinally directed pull along the longitudinal axis of the fishing rod itself. With the invention, a fishing rod holder apparatus is provided which reduces a tendency for the fishing rod to be dislodged from the fishing rod holder when a side to side force is exerted on the fishing rod. With the invention, a fishing rod holder apparatus is provided which permits a person to quickly remove a fishing rod from the fishing rod holder along a trajectory that is conducive to retaining a hooked fish on the hook. With the invention, a fishing rod holder apparatus is provided which is adjustable to fit a variety of widths of railings. With the invention, a fishing rod holder apparatus is provided which includes structures with receive and support and handle and reel of a fishing rod.

Thus, while the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use.

Hence, the proper scope of the present invention should be determined only by the broadest interpretation of the appended claims so as to encompass all such modifications as well as all relationships equivalent to those illustrated in the drawings and described in the specification.

Finally, it will be appreciated that the purpose of the annexed Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

What is claimed as being new and desired to be protected by Letters Patent of the United States is as follows:

1. Apparatus for holding a fishing rod or the like, comprising:
   a first support unit which includes a rod reception portion and means for supporting said rod reception portion,
   a second support unit connected to said first support unit, and
   a third support unit connected to said second support unit, wherein said third support unit includes a front extension portion connected to said second support unit, a first handle rest portion connected to said front extension portion, a rear extension portion connected to said first handle rest portion, and a second handle rest portion connected to said rear extension portion, and
   wherein said second support unit includes first separation distance adjustment means, and
   wherein said third support unit includes second separation distance adjustment means which engage with said first separation distance adjustment means,
   said first separation distance adjustment means includes a pair of adjustment tubes,
   said second separation distance adjustment means includes a pair of adjustment rods telescopically received in said adjustment tubes, and
   each of said adjustment tubes includes a first direction projecting tube portion and a second direction projecting tube portion.

2. The apparatus of claim 1 wherein said rod reception portion is V-shaped and said means for supporting said rod reception portion includes a pair of first risers connected to opposite ends of said V-shaped rod reception portion.

3. The apparatus of claim 2 wherein said second support unit includes railing rest means and said railing rest means includes a pair of railing rest members connected to said pair of first risers and includes a U-shaped member depending downward from said railing rest members.

4. The apparatus of claim 1 wherein said front extension portion is connected to said second support unit by a downwardly curved portion.

5. The apparatus of claim 1 wherein said second handle rest portion is connected to said rear extension portion by an upwardly curved portion.

6. The apparatus of claim 2, further including:
   a reinforcement strut connected between said first risers.

7. The apparatus of claim 1 wherein said first direction projecting tube portion is longer than said second direction projecting tube portion.

8. The apparatus of claim 1, further including:
   locking means for locking said first separation distance adjustment means in a selected location with respect to said second separation distance adjustment means.

9. The apparatus of claim 8 wherein said locking means includes: locking bolt reception channels in said adjustment tubes, and locking bolts received in said locking bolt reception channels.

* * * * *